(12) United States Patent
Flinner et al.

(10) Patent No.: US 7,856,831 B2
(45) Date of Patent: Dec. 28, 2010

(54) AUXILIARY COOLING DEVICE

(75) Inventors: Klaus Flinner, Zoeschingen (DE);
Georg Hausmann, Dillingen (DE);
Stefan Holzer, Aalen (DE); Fritz Haegele, Herbrechtingen (DE); Joerg Stelzer, Giengen/Brenz (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 54 days.

(21) Appl. No.: 10/535,919

(22) PCT Filed: Dec. 18, 2003

(86) PCT No.: PCT/EP03/14465
§ 371 (c)(1),
(2), (4) Date: May 23, 2005

(87) PCT Pub. No.: WO2004/059223
PCT Pub. Date: Jul. 15, 2004

(65) Prior Publication Data
US 2006/0053805 A1    Mar. 16, 2006

(30) Foreign Application Priority Data
Dec. 30, 2002  (DE)  ................ 102 61 366

(51) Int. Cl.
*F25B 21/02* (2006.01)

(52) U.S. Cl. .......................................... 62/3.2; 62/440

(58) Field of Classification Search ............ 62/3.3, 62/3.5, 3.6, 3.63, 440, 441, 3.2, 216, 333, 62/335, 64, 336, 373, 374, 378; 165/80.3
See application file for complete search history.

(56) References Cited

U.S. PATENT DOCUMENTS

| 3,052,100 | A |   | 9/1962  | Homkes |
| 3,209,547 | A | * | 10/1965 | Elfving ..................... 62/3.6 |
| 3,216,204 | A |   | 11/1965 | Milligan et al. |
| 3,490,201 | A | * | 1/1970  | Colvin et al. .............. 95/113 |
| 3,881,323 | A | * | 5/1975  | Porter ....................... 62/216 |

(Continued)

FOREIGN PATENT DOCUMENTS

DE  1 198 837 B1  8/1965

(Continued)

*Primary Examiner*—Mohammad M Ali
(74) *Attorney, Agent, or Firm*—James E. Howard; Andre Pallapies

(57) ABSTRACT

An auxiliary cooling device to be used in another cooling device, which auxiliary cooling device includes a thermoelectric element, such as a Peltier element, provided with a heat source and a heat sink connected in a circuit. The heat sink is used for directly or indirectly cooling an item, for example a bottle of fluid. The heat source, which is thermally isolated with respect to the heat sink, is in close thermal contact with a heat exchange fluid in a container. The heat exchange fluid is used as a thermal buffer for the waste heat generated by the cooling process.

8 Claims, 4 Drawing Sheets

U.S. PATENT DOCUMENTS

| | | | | |
|---|---|---|---|---|
| 4,113,004 | A * | 9/1978 | Rush et al. | 165/7 |
| 4,134,743 | A * | 1/1979 | Macriss et al. | 95/113 |
| 4,729,774 | A * | 3/1988 | Cohen et al. | 96/123 |
| 4,759,190 | A * | 7/1988 | Trachtenberg et al. | 62/3.62 |
| 5,237,835 | A * | 8/1993 | Brochier | 62/376 |
| 5,269,146 | A * | 12/1993 | Kerner | 62/3.6 |
| 5,544,487 | A * | 8/1996 | Attey et al. | 62/3.7 |
| 5,632,954 | A * | 5/1997 | Coellner et al. | 422/4 |
| 5,724,819 | A * | 3/1998 | Boeckel et al. | 62/3.7 |
| 5,782,106 | A * | 7/1998 | Park | 62/452 |
| 5,871,526 | A * | 2/1999 | Gibbs et al. | 607/104 |
| 6,038,865 | A * | 3/2000 | Watanabe et al. | 62/3.6 |
| 6,082,144 | A | 7/2000 | Jencks et al. | |
| 6,295,820 | B1 * | 10/2001 | Cauchy et al. | 62/3.6 |
| 6,412,286 | B1 | 7/2002 | Park et al. | |
| 6,463,743 | B1 * | 10/2002 | Laliberte | 62/3.3 |
| 6,736,298 | B2 * | 5/2004 | Busick et al. | 222/638 |
| 6,854,275 | B2 * | 2/2005 | Evans | 62/3.2 |

FOREIGN PATENT DOCUMENTS

| | | |
|---|---|---|
| DE | 1 227 922 B1 | 11/1966 |
| DE | 26 10 725 A1 | 9/1977 |
| DE | 35 28 731 A1 | 3/1986 |
| EP | 0 347 286 A1 | 12/1989 |
| FR | 270624 A1 * | 12/1994 |
| JP | 11-333339 A * | 2/1999 |

* cited by examiner

AUXILIARY COOLING DEVICE

The present invention relates to an auxiliary cooling device, which can be used in a cooling device, in particular a domestic refrigerator without frost compartment, to temporarily attain cooling temperatures below a normal operating temperature of the cooling device. In conventional terms a user, wanting to have storage areas with temperatures over and under 0° C. available in a cooling device, must purchase a combination unit or a refrigerator with a so-called 3- or 4-star freezing compartment. Normal cooling compartment and star-rated freezer compartment are cooled by a common refrigerant circuit, whereby however in the star-rated freezer compartment lower evaporator temperatures have to be reached than in the normal cooling compartment. Such a refrigerator therefore has a higher specific power consumption than a comparable unit without star-rated freezer compartment. This is in particular uneconomical if the star-rated freezer compartment is used only occasionally for freezing small quantities.

Many users of a refrigerator also have a freezer, which they use for long-term storage of frozen foodstuffs, and for this purpose they do not a star-rated freezer compartment. Many users nevertheless do not want to dispense with a star-rated freezer compartment so that they can make e.g. ice cubes or quickly cool drinks in it.

For both purposes a freezer is less suitable, on the one hand because of the difficulty in securely placing an ice cube maker therein, and on the other hand, because in the case of drinks there is the risk that they might freeze at temperatures prevalent in the freezer and burst their container. Also, in contrast to a refrigerator the freezer is generally not placed in the immediate living area, so that using the star-rated freezer compartment is simple and just more comfortable.

The object of the present invention is to provide an auxiliary cooling device for a cooling device, in particular for a refrigerator without star-rated freezer compartment, which enables a user to rapidly cool or respectively freeze goods such as drinks or water, requiring little space in the interior of a refrigerator and not increasing the power consumption of the cooling device when not in use.

This task is solved by an auxiliary cooling device having the characteristics of claim 1. By placing the container with the heat exchange fluid in a refrigerator the latter is cooled to its operating temperature. Based on this temperature the Peltier element can be operated to cool down goods to be cooled, which are placed in thermal contact with the heat sink of the Peltier element, in a short time and to a temperature below the storage temperature of the refrigerator and which can be below 0° C. The heat released from its heat source when the Peltier element is operating is first discharged into the first heat exchange fluid, from where it is distributed into the surrounding storage space of the refrigerator. The close thermal contact with the heat exchange fluid allows the heat source of the Peltier element during operation to be kept at a clearly lower temperature, than if the heat source were to be arranged freely in the storage space of the refrigerator, resulting in good efficiency of the Peltier element.

To attain effective heat exchange between the heat source and the first heat exchange fluid, the heat source can effectively be arranged on a wall of the first container.

The heat sink can again be in close thermal contact with an ice cube tray, if the auxiliary cooling device is to be used for making ice cubes.

Such an ice cube tray effectively comprises a good heat-conductive material such as aluminium or an aluminium alloy.

The heat sink is preferably arranged on an underside of the ice cube tray.

A compact structure is obtained if the ice cube tray forms an upper termination of the first container.

In terms of a second configuration the thermal contact between the heat sink of the Peltier element and goods to be cooled is made via a second heat exchange fluid, accommodated in a second container. To obtain fast effective cooling such a container can be adapted to the form of an item to be cooled, in particular in that it has a recess for taking up the item.

The heat sink can be arranged directly on a wall of this second container, though it is also conceivable to attach it to a chamber, which is connected by lines to the second container, and to provide means for circulating the heat exchange fluid between the chamber and the second container such as a pump.

To be able to match the form of the recess precisely to alternating shapes of items to be cooled, it is effective that an internal wall of the second container, which delimits the recess, is flexible. The external wall of the container on the other hand can be stiff, thus ensuring good handling of the container. Another possibility is that the second container generally has flexible walls and can be formed into a collar, which can e.g. be wound around a bottle to be cooled.

If the second container has a stiff external wall and a flexible internal wall, it is effective if the chamber, in which heat exchange takes place, is deeper than the container. If also a pump is arranged in a supply line of the heat exchange fluid from the chamber into the second container, it creates overpressure in the second container when running, which presses its flexible internal wall hard against an item to be cooled, in contrast to which the heat exchange fluid is inclined to flow into the chamber when the pump is switched off, thus releasing the item to be cooled. The same effect can be achieved or reinforced when a bottleneck forms in a recirculating line of the heat exchange fluid from the second container into the chamber, in which a drop in pressure takes place when the pump is running.

Means for reversing the direction of flow in the circuit of the Peltier element are appropriate to be able to temporarily interchange the functions of heat sink and heat source. In an auxiliary cooling device used as ice cube maker it is thus possible to superficially thaw the finished ice cubes and therefore to make it easier to loosen the ice cubes from their tray.

In order to avoid unnecessary thermal load of a refrigerator, in which the auxiliary cooling device is located, by its operation it is appropriate to equip the auxiliary cooling device with a temperature sensor in contact with the second heat exchange fluid and with a control circuit, which switches off the thermoelectric element and, if available, also means for circulating heat exchange fluid, if the temperature detected by the temperature sensor drops below a limit value.

A similar effect can also be achieved using a time switch device, which switches off the thermoelectric element, and if necessary means for circulating heat exchange fluid after a fixed duration of operation.

The auxiliary cooling device can be configured as a device which is independent from the refrigerator or generally the cooling device, in which it can be used, and is placed in the latter only when required. In an auxiliary cooling device built in to a cooling device it can be appropriate for reasons of space economy to embed the first container in an isolating wall of the cooling device.

Further features and advantages of the auxiliary device according to the present invention will emerge from the following description of embodiments with reference to the attached figures, in which.

Figure 1:
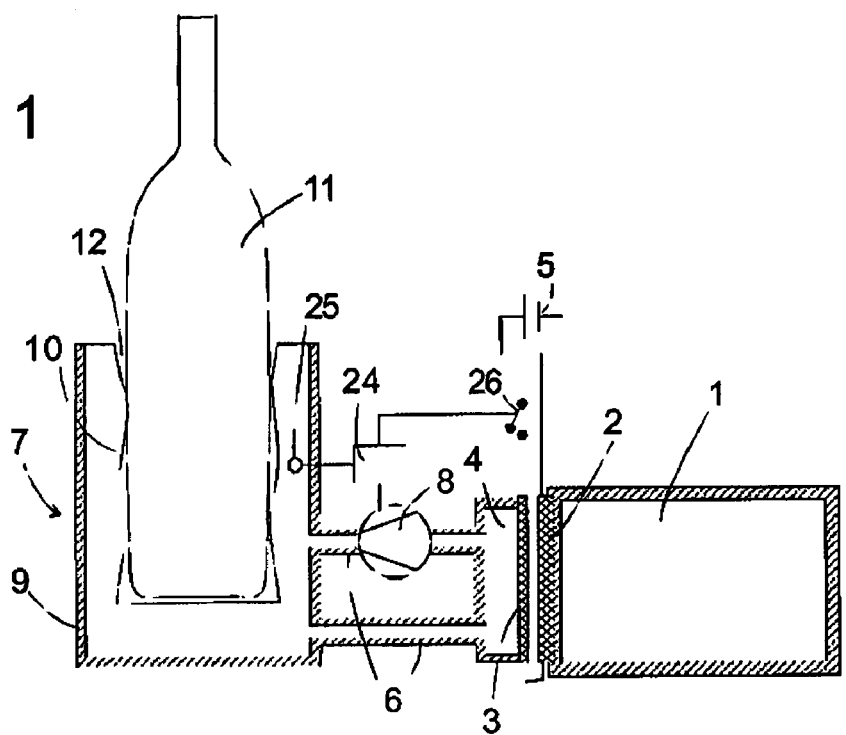
FIG. 1 is a schematic section through a first configuration of an auxiliary cooling device according to the present invention, which is fitted specially for cooling bottles.

FIG. 1 is a schematic section through an auxiliary cooling device according to the present invention. The auxiliary cooling device comprises a first container 1, filled with a heat exchange fluid. A Sole or an alcohol-water mixture, having a freezing point of below 0° C., is generally used as heat exchange fluid. Since the auxiliary cooling device is provided to be used in the storage compartment of a refrigerator, which does not generally reach temperatures below 0° C., the use of pure water as first heat exchange fluid would also be considered.

A Peltier element is illustrated here schematically as a heat source 2, extending over a wall of the first container 1, and a heat sink 3, forming a wall of a chamber 4. The heat source and the heat sink are illustrated here as two large-surface elements, connected in series in a direct-current flow with supply terminals 5. In practice the Peltier element can have a plurality of source-sink pairs connected in series, whereby each source or respectively each sink is formed by surface contact between two metals, whereby the current in a sink in each case flows from a first to the second metal and in a heat source from the second metal back to the first.

The chamber 4 is connected via two pipes 6 to a second container 7. Arranged in one of the pipes 6 is an electrically operated pump 8, which can be driven to circulate a second heat exchange fluid between the chamber 4 and the second container 7. The composition of the second heat exchange fluid can with identical to the first.

The second container 7 has the form of a scoop open upwards with a stiff external wall 9 and an internal wall 10 formed by a thin, flexible membrane.

As a result of its flexibility the internal wall 10 can adapt closely to a bottle 11 or another item, placed for cooling in the upwards open recess 12 of the second container 7.

If the auxiliary cooling device is operating and the pump 8 and the Peltier element are supplied with current, the second heat exchange fluid is cooled on the heat sink 3, is conveyed by the pump 8 to the second container 7, where it rinses the bottle 11 and quickly cools, and then flows back into the chamber 4. The heat absorbed by the heat sink 3 is given out by the heat source 2 to the heat exchange fluid in the first container 1 and from there is distributed in the storage space of the refrigerator. If the auxiliary cooling device is operating the efficiency requirement of the cooling machine of the refrigerator is increased, since this must additionally carry away the waste heat of the auxiliary cooling device. If the auxiliary cooling device is not operating it has no effect on the energy requirement of the refrigerator.

In any case the heat exchange fluids in the containers 1, 7 and the chamber 4 have the effect of thermal ballast, which prolongs the on-off switching cycles of the cooling machine and thus even improves its efficiency.

A control circuit 24 is connected on one side to a temperature sensor 25 in contact with the heat exchange fluid and arranged in the second container 7 and on the other side connected to the pump 8 and a switch 26 in the supply line of the Peltier element 2, 3. The control circuit 24 keeps the pump 8 operating and maintains power supply to the Peltier element 2, 3, until the temperature detected by the sensor 25 no longer drops below a preset limit value. When there is a drop below the limit value this switches off the Peltier element and the pump, and restarts it only when the sensor 25 shows a rise in temperature. By means of the sensor 25 and the control circuit 24 subcooling of the bottle 11 can be prevented, if this is necessary for longer than for cooling in the auxiliary cooling device. The limit value can be preset, e.g. at a temperature of 1 to 2° C., to prevent accidental freezing of a bottle water, or it can be adjusted by a user.

In a simplified configuration the control circuit 24 and the temperature sensor 25 can also be replaced by a delay circuit, which in each case shuts off pump 8 and Peltier element 2, 3 with a fixed delay or a delay adjustable by a user, after the auxiliary cooling device has been started.

Figure 2:
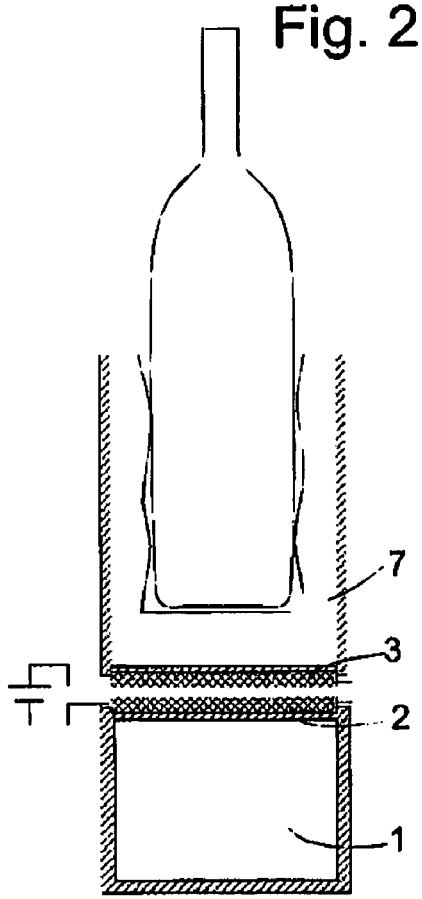
FIG. 2 is a simplified, compact configuration of the auxiliary cooling device for cooling bottles.

In the configuration of FIG. 2 the Peltier element with heat source 2 and heat sink 3 is arranged immediately between the first container 1 and the second container 7 mounted thereon. The chamber 4 and the pump 8 are missing. With this configuration it is possible, despite the lack of forced circulation of the second heat exchange fluid in the container 7, to have effective cooling of the bottle 11, whenever the second heat exchange fluid substantially comprises water. Water is known to have its greatest density at ca. 4° C., so that, when it is cooled on the heat sink 3 to below this value, it is inclined to rise in the second container 7 to thus cool the bottle 11.

Figure 3:
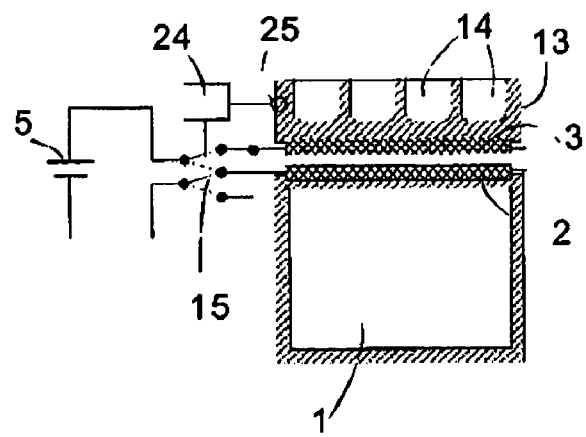
FIG. 3 is a schematic section through an auxiliary cooling device for making ice cubes.

The auxiliary cooling device illustrated schematically in FIG. 3 is designed as an ice cube maker.

The first container 1 and the Peltier element with heat source 2 and heat sink 3 do not differ from the corresponding parts of FIG. 2. The second container 7 from FIG. 2 however is replaced by a solid aluminium shell 13, on the top side whereof is formed a plurality of recesses 14, in each case acting as moulds for ice cubes (i.e., an ice cube tray).

Arranged between the supply terminals 5 and the Peltier element is a three-way switch 15 with two switch settings, which allows the direction of flow through the Peltier element to be reversed. The switch setting corresponding to normal operation of the auxiliary cooling device is that, in which the part of the Peltier element in thermal contact with the first container 1 works as heat source and the part in thermal contact with the aluminium shell 13 works as heat sink to freeze water in the recesses 14. If the water in the recesses is frozen, a user can bring the three-way switch 15 into its other switch setting, in which the direction of flow is reversed by the Peltier element and its part in thermal contact with the aluminium shell 13 works as heat source. With brief heating of the tray 13 the ice cubes in the recesses 14 are thawed superficially, so that they are easily loosened from the recesses.

Also with this configuration of the auxiliary cooling device, as shown in FIG. 3, a control circuit 24 and a temperature sensor 25 can be provided, whereby the temperature sensor 25 is arranged in contact here with the aluminium shell 13 and when there is a drop below a limit temperature the control circuit 24 brings the switch 15 into a third position, in which the current flow is interrupted by the Peltier element 2, 3.

Figure 4:
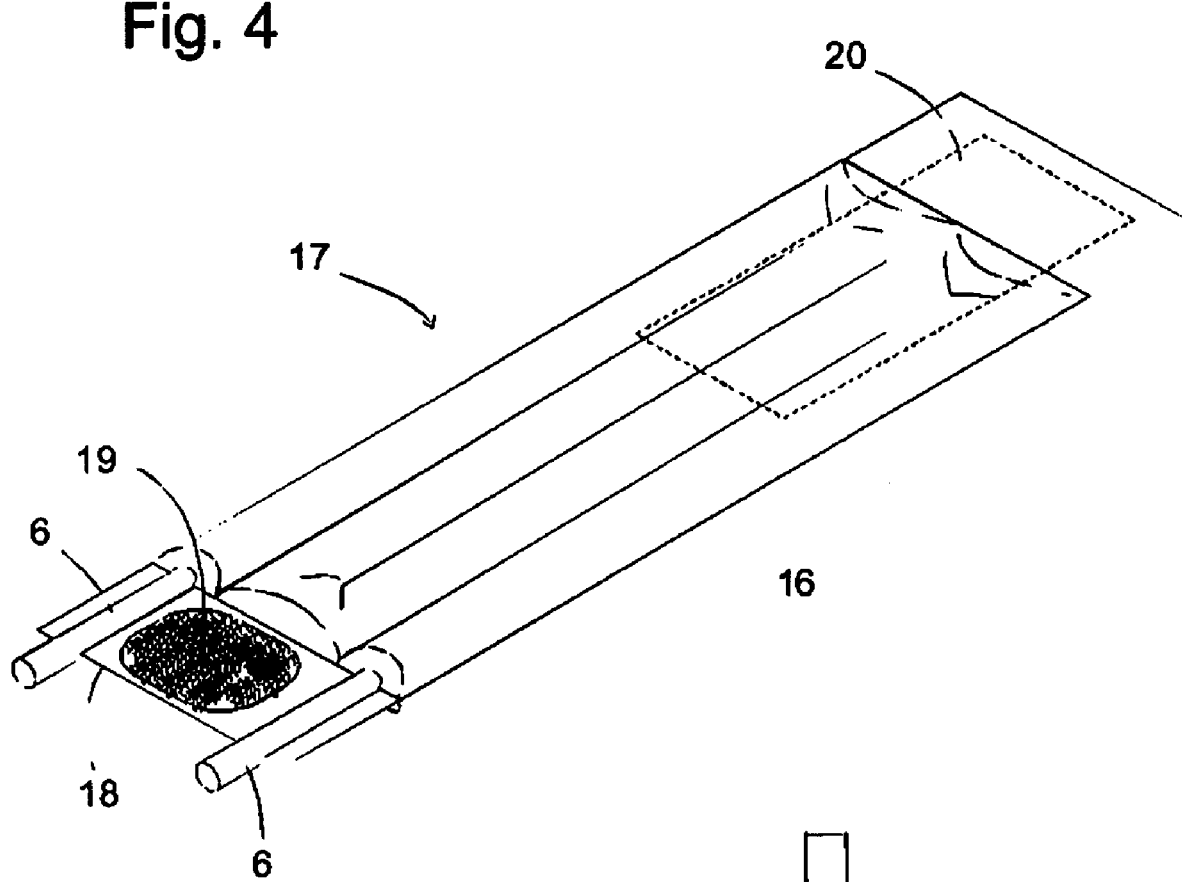
FIG. 4 is a perspective view of a second container of an auxiliary cooling device, configured as a collar.

FIG. 4 shows a variant configuration of the second container. The walls of the second container 17 shown in FIG. 4 are formed by flexible plastic films, welded locally to one another, to form a hose-like inner space running in a zigzag. The films are welded flat to one another at one long end into a flat tongue 18. Two pipes 6 for supplying and discharging the second heat exchange fluid extend, in between the two films, along the tongue 18 and in each case terminate at a long end of the hose-like cavity. A Velcro strip 19 is arranged on the side of the tongue 18 facing the observer in FIG. 4. A Velcro strip 20 complementary to the strip 19, shown in the figure as a dashed outline, is located on the side of the container 17 averted from the observer.

Figure 5:
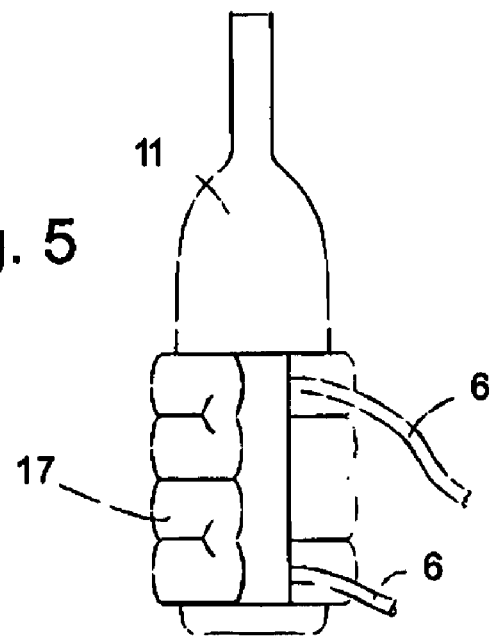
FIG. 5 is a schematic view of a bottle to be cooled, on which the collar from FIG. 4 is arranged.

FIG. 5 shows the container 17 in use as a bottle 11 is cooling. The container is wrapped around the body of the bottle 11 such that the two Velcro parts 19, 20 in FIG. 5 come into contact and adhere to one another.

Due to its flexibility the container 17 is capable of adapting positively to bottles with differing diameters and thus to effect very intensive heat exchange between the bottle and the second heat exchange fluid circulating in the second container 17.

Figure 6:
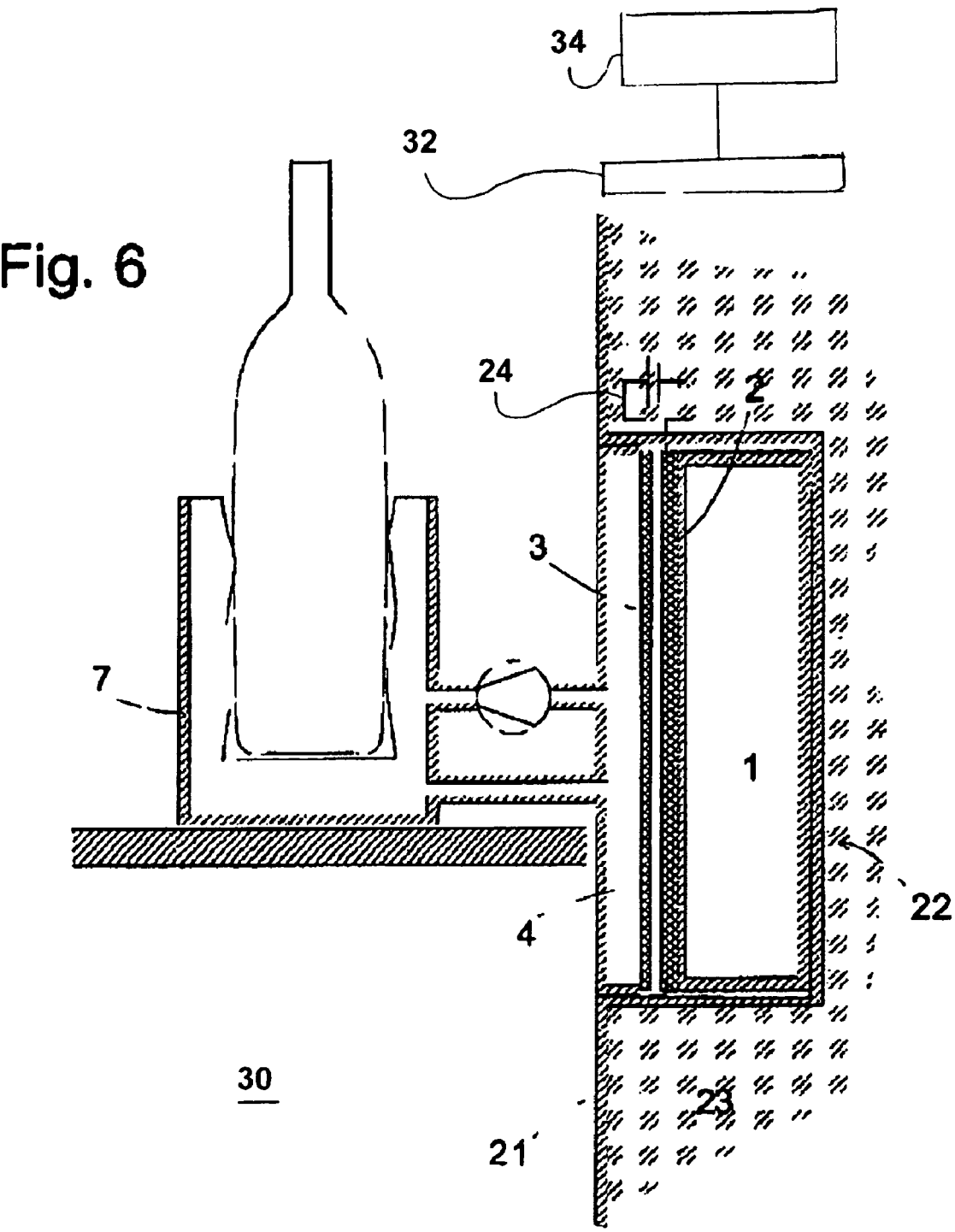
FIG. 6 shows a variation of the auxiliary cooling device from FIG. 1, in which the first container is set into the wall of a refrigerator.

FIG. 6 shows a modification to the auxiliary cooling device of FIG. 1, wherein the first container 1 and the chamber 4 are set in a recess 22 of an inner container wall 21 of a refrigerator. The refrigerator includes a main compartment 30 and an internal cooling device 34 to cool the main compartment 30. A main controller 32 is provided in communication with the control circuit 24 and the cooling device 34 for controlling temperatures within the main compartment 30 and for controlling the auxiliary cooling device. Due to this construction the space requirement of the auxiliary cooling device in the interior of the refrigerator is considerably reduced. Due to the recess 22 the thickness of an insulating foam layer 23, which fills out the cavity between the inner container wall 21 and an external wall (not shown here) of the refrigerator, is reduced locally. This can however be taken into consideration here since the chamber 4, the insulating cavity between heat source 2 and heat sink 3 of the Peltier element and the first container with the heat exchange fluid contained therein all contribute to the thermal insulation of the inner space of the refrigerator and thus balance the effect of the thinner insulating foam layer 23.

Figure 7:
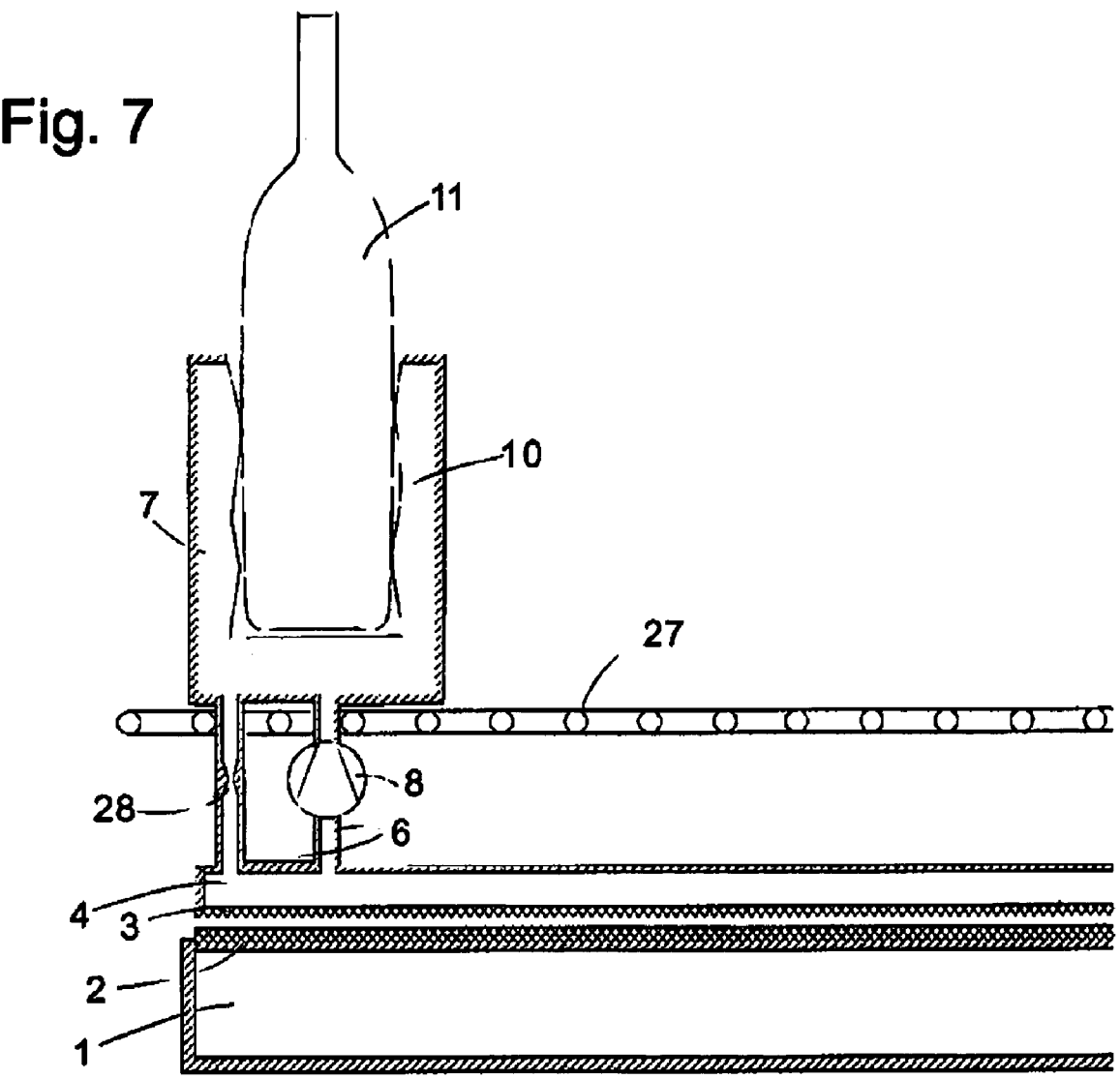
FIG. 7 shows a second variation of the auxiliary cooling device from FIG. 1.

FIG. 7 shows a second variant of the auxiliary cooling device from FIG. 1, in which the second container 7 is placed on a compartment floor 27 of the refrigerator and the chamber 4 and the first container 1 are arranged directly below the compartment floor 27. The distance between the chamber 4 and the compartment floor 27 apparent in the schematic illustration of the figure acts only to show up the lines 6 for the heat exchange fluid between chamber 4 and second container 7 and the pump 8.

The first container 1 and the chamber 4 extend over the whole width of the compartment floor 27 and thus have large-surface facing walls, on which the Peltier element 2, 3 can be arranged. The large wall surfaces also facilitate flexible deformation of the chamber 4 in the event of fluctuations in pressure.

Formed in one of the lines 6, in which the heat exchange fluid flows from the second container 7 back into the chamber 4, is a bottleneck 28. At this bottleneck 28 the heat exchange fluid builds up, when the pump 8 is operating, such that an overpressure builds up in the container 7, which presses the flexible wall 10 tightly onto the bottle 11 and thus enables highly effective heat exchange. The resulting lack of heat exchange fluid in the chamber 4 is balanced by deformation of the upper wall of the chamber 4. When the pump 8 is switched off, the heat exchange fluid is inclined to collect in the chamber 4 lying at a deeper level than the second container 7, by means of which the upper wall of the chamber bulges and the flexible wall 10 of the second container 7 withdraws from the bottle 11 and releases the latter.

The invention claimed is:

1. An auxiliary cooling device for use in another cooling device; comprising:

a Peltier thermoelectric element; said thermoelectric element including a heat source and a heat sink; said heat source and said heat sink connected in a circuit;

a first closed container having a first heat exchange fluid therein, said first heat exchange fluid in thermal contact with said heat source and insulated thermally from said heat sink; and a second closed container having a second heat exchange liquid therein, said heat sink in thermal contact with said second heat exchange liquid, said second container including a flow path for said second heat exchange liquid extending between a first chamber adjacent the heat sink and a second chamber comprising a recess into which an item to be cooled can be placed, wherein an internal wall of the second chamber delimiting the recess is flexible so that it can conform to an exterior shape of an item to be cooled.

2. The auxiliary cooling device according to claim 1, wherein a plurality of walls form at least part of said first container and said heat source is arranged on one of said walls.

3. The auxiliary cooling device according to claim 1, further comprising a plurality of walls forming at least part of said second container and wherein said heat sink is arranged on one of said walls.

4. The auxiliary cooling device according to claim 1, further comprising lines for said second heat exchange liquid to flow through, said heat sink arranged on said first chamber and including means for circulating said second heat exchange liquid between said first chamber and said second chamber through said lines.

5. An auxiliary cooling device for use in another cooling device; comprising:

a Peltier thermoelectric element; said thermoelectric element including a heat source and a heat sink; said heat source and said heat sink connected in a circuit;

a first container having a first heat exchange fluid therein, said first heat exchange fluid in close thermal contact with said heat source and insulated thermally from said heat sink;

a second container having a second heat exchange liquid therein and said heat sink in close thermal contact with said second heat exchange liquid, wherein the second container comprises a flexible elongated member that can be attached around an exterior of an item to be cooled and wherein the second heat exchange liquid moves through passages in the flexible elongated member;

a chamber coupled to said second container; and a recirculating line coupled between said second container and said chamber.

6. The auxiliary cooling device according to claim 1, further comprising means for reversing the direction of heat flow of said circuit.

7. The auxiliary cooling device according to claim 4, wherein a line that returns the second heat exchange liquid from the second chamber to the first chamber comprises a flow restriction that causes a fluid pressure in the second chamber to increase above a fluid pressure in the first chamber, to thereby cause the flexible internal wall of the second chamber to conform to an exterior surface of an item to be cooled located in the second chamber.

8. The auxiliary cooling device of claim 7, wherein a wall of the first chamber is flexible.

* * * * *